Nov. 9, 1954   E. RAWSON   2,693,703
SUSPENDED MILKER
Filed Aug. 23, 1949   2 Sheets-Sheet 1
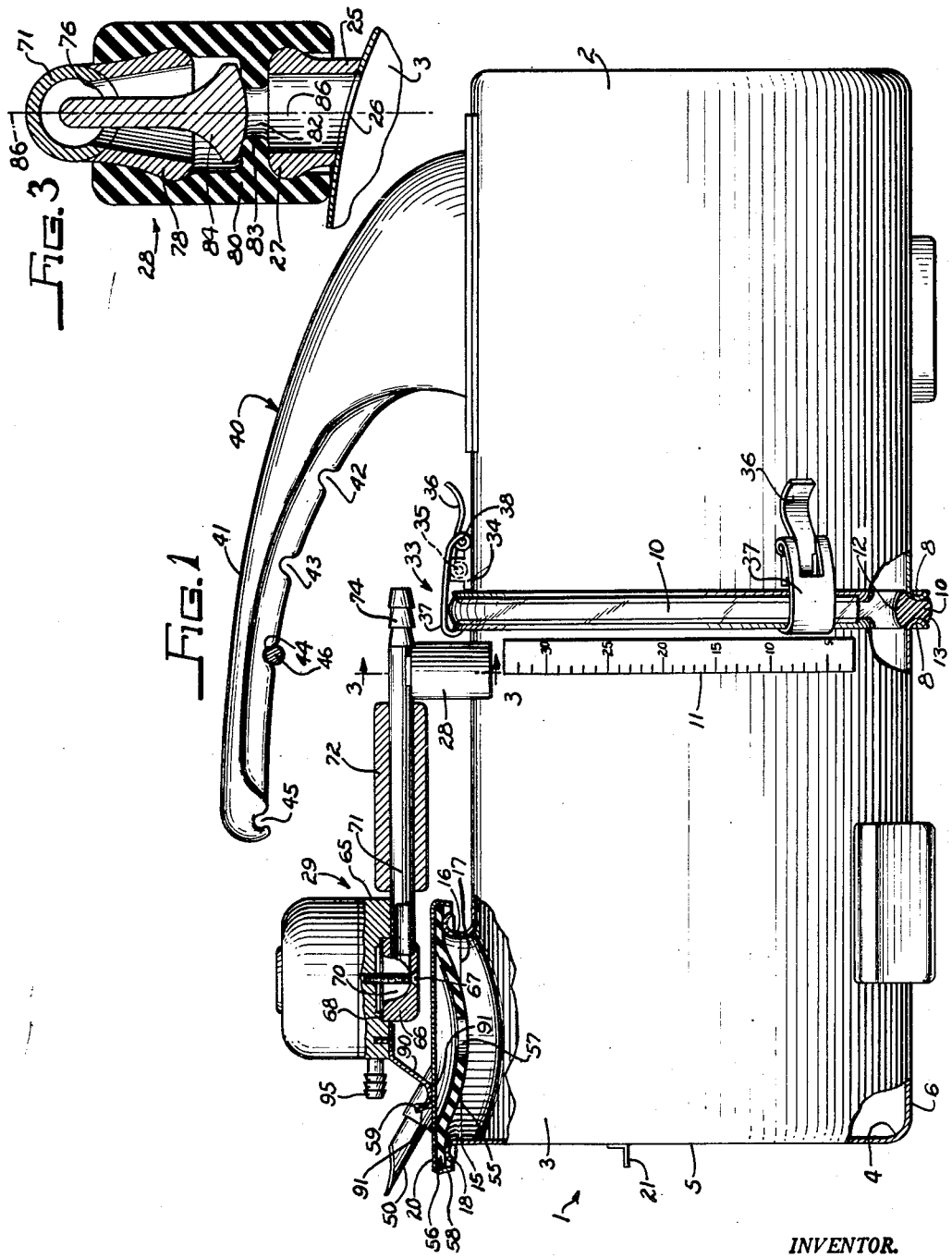
INVENTOR.
Emanuel Rawson
BY Morris Spector
Atty.

Nov. 9, 1954 E. RAWSON 2,693,703
SUSPENDED MILKER
Filed Aug. 23, 1949 2 Sheets-Sheet 2
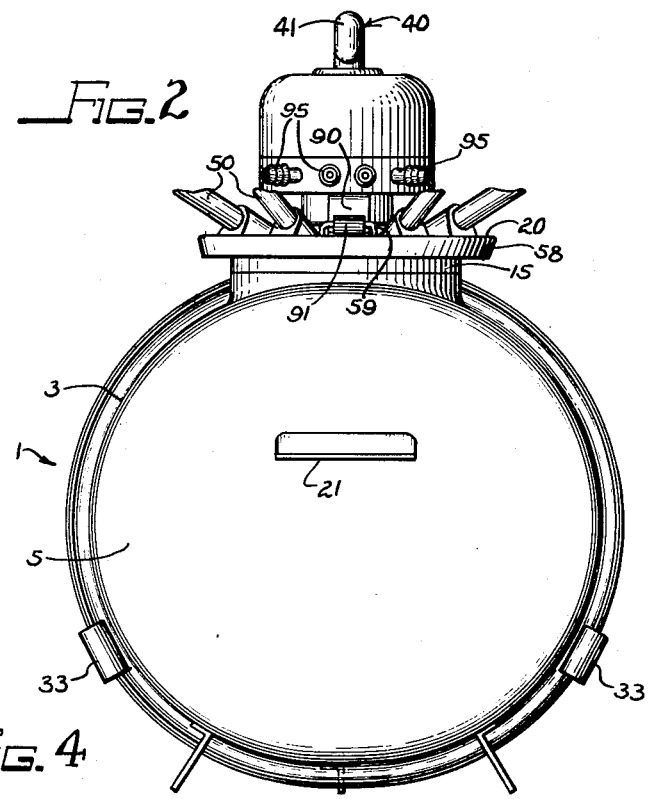
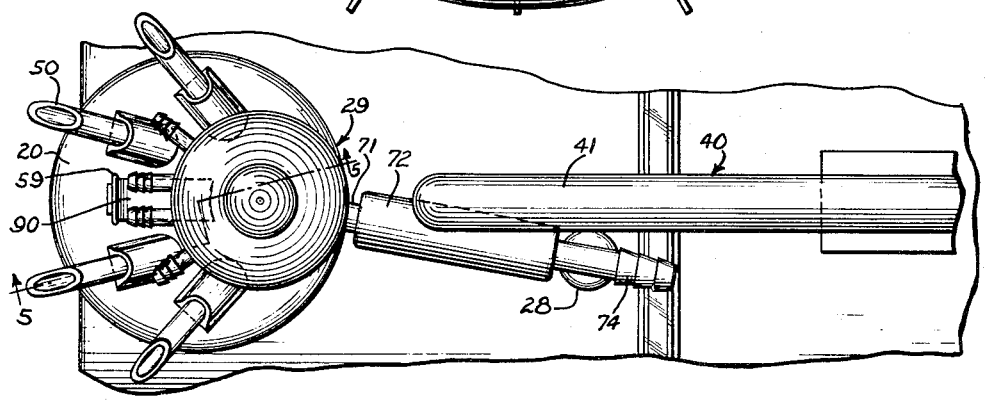
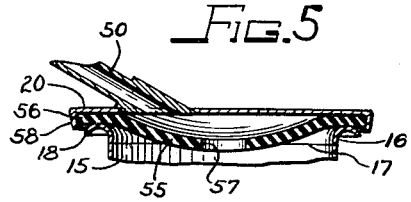
INVENTOR.
Emanuel Rawson
BY Morris Spector
Atty United States Patent Office 2,693,703
Patented Nov. 9, 1954

2,693,703

SUSPENDED MILKER

Emanuel Rawson, Chicago, Ill., assignor, by mesne assignments, to Package Machinery Company, a corporation of Massachusetts Application August 23, 1949, Serial No. 111,934

15 Claims. (Cl. 73—334)

This application is a continuation in part of my pending application, Serial No. 70,300, filed January 18, 1949, now Patent No. 2,665,663.

The present invention relates to suspended milkers, particularly of the vacuum type. It is one of the objects of this invention to provide a suspended milker which is constructed to facilitate cleaning of the same.

It is a further object of this invention to provide a milker that has incorporated therein a very simple means for giving a fairly accurate visual indication of the quantity of milk in the container. In accordance with the broad principles of the present invention the milker comprises an elongated cylindrical receptacle that is adapted for mounting in milking position with its longitudinal axis approximately horizontal. The receptacle has a vertically extending releasable seam where two of the container parts are clamped together to form a complete receptacle. At this vertical seam there is provided a sealing gasket to assure a liquid tight joint. It is an object of this invention to utilize a sealing gasket of transparent or translucent material as a sight glass for showing the milk level in the container. This is possible because the sealing gasket extends in substantially a vertical plane when the milker is used in its usual manner.

In milkers of the above mentioned type a vacuum is maintained within the milker. The milker is provided with a number of nipples, generally four, through which milk flows into the receptacle from the teat cups that are placed on the cow's udder. It is customary to have the milk nipples on the receptacle extend at an acute angle to the horizontal. The milk entering the receptacle from the nipples has a tendency to disturb the milk already in the receptacle, causing it to swish back and forth. As the receptacle approaches its normally filled condition the swishing of the milk back and forth within the receptacle becomes highly objectionable for a number of reasons, one of which is that the moving milk may splash against the vacuum inlet opening of the receptacle and be drawn into the vacuum line. It is an object of this invention to provide means for inhibiting the tendency of the milk flowing into the receptacle from producing longitudinal movement of the milk within the receptacle. This is accomplished by directing the inwardly flowing stream or streams of milk so as to produce substantially no longitudinal movement of the milk within the receptacle. In one preferred construction wherein the milk line receiving nipples are on the cover of the pour-out spout, the anti-splash arrangement consists of a special gasket which also serves to make the cover air tight on the pour-out spout. This gasket is an oversized flat rubber disc between the cover and the pour-out spout. When the disc is positioned in the lid it bulges outwardly and acts as a splash baffle for the inwardly flowing stream or streams of milk.

It is a further object of the present invention to provide a simple arrangement for mounting the lid, inflations, and the milk receptacle as an assembly, wherein the act of positioning the assembly serves to establish a plug-in type of vacuum line connection to the receptacle. It is another object of this invention to provide a simple plug-in type valve adapted for vacuum milkers, which valve lends itself to easy and quick assembly and disassembly as may be required for cleaning of the valve.

The attainment of the above and further objects of the present invention will be apparent from the following specification taken in conjunction with the accompanying drawings forming a part thereof.

In the drawings:

Figure 1 is a side view, in partial section, of a suspended milker embodying the present invention;

Figure 2 is a left hand end view of the milker of Figure 1;

Figure 3 is an enlarged sectional view taken along the line 3—3 of Figure 1;

Figure 4 is a fragmentary top view of the milker of Figure 1; and

Figure 5 is a fragmentary sectional view taken along the line 5—5 of Figure 4.

Reference may now be had more particularly to the drawings wherein like reference numerals designate like parts throughout.

The receptacle of the present invention, indicated by the reference numeral 1, includes two similar deep drawn stainless steel cylindrical containers 2–3, circular in cross section. The containers are of identical size so that the same dies can be used for making both containers substantially to completion. Each of the two containers is smooth and substantially devoid of sharp corners to facilitate cleaning. To that effect the juncture 4 between the end 5 and the cylindrical body is along a smooth curve. At its outer end each container has a smooth curl 8 extending outwardly around the entire periphery of the opening and is entirely seamless so that the entire outer surface of the curl 8 is perfectly smooth for receiving a gasket 10 which seals around the curl.

The gasket is preferably made of transparent or translucent material so that it can be utilized as a sight glass through which the milk level in the receptacle can be viewed. One substance suitable for this gasket is a plasticized polyvinyl chloride compound, known in the trade as "Koroseal." In order that the gasket may be transparent or translucent it is desirable that the same be made by extrusion, rather than by molding. The gasket is extruded and formed into an endless ring. Adjacent the gasket 10 the receptacle 3 has a scale 11 which is calibrated to indicate the milk content of the receptacle in terms of any desired unit as, for instance, pounds or quarts of milk in the receptacle comprising the containers 2 and 3. The cross section of the gasket is illustrated in Figure 1 from which it can be seen that the gasket is curved along a smooth inner curve 12, and a smooth outer curve 13 of smaller radius of curvature than the inner curve. The two curves 12 and 13 are joined by side curves into which the curls 8 extend, those side curves being of a slightly larger radius of curvature than the radius of curvature of the outside of the curl engaged thereby. As a result of this, when the gasket is compressed by drawing the two curls 8—8 towards one another it automatically centers the two containers.

While I have herein spoken about the gasket 10 and the scale 11 as being separate from one another, it is within the purview of the present invention to mark the calibrated scale directly on the outer curve 13 of the gasket, in which event the gasket would be arranged to be positioned in one, and only one, position between the containers.

The container 3 has a circular pour-out opening or spout 15 formed in the cylindrical wall thereof adjacent the end wall 5. The pour-out spout is formed by piercing and then drawing the metal of the cylindrical wall of the container outwardly. Where the metal is of insufficient thickness to permit drawing the same outwardly for the full extent necessary for forming the spout, there is provided a stainless steel sheet metal ring 16 which is welded to the spout portion 15 along a smooth line of weld 17. The ring 16 is provided at its top with an outward smooth curl 18 that extends around the entire periphery of the ring. This constitutes the milk receiving opening and also the pour-out opening for the receptacle. The opening of the pour-out spout is adapted to be closed by a cover 20 which will be later described. An angle iron ledge 21 is welded to the end 5 of the container 3 to be used in supporting one end of the milker on a milk receiving can as milk is being poured from the receptacle 1 through the spout 15.

The container 3 is provided with a vacuum inlet nipple or ring fitting 25 that fits flush on the cylindrical surface of the container around a hole 26 (Fig. 3), being soldered or welded to the container all around the hole 26. At its upper end the fitting 25 has an enlargement or head 27 which extends around the entire periphery thereof, whereby a check valve 28, to be more fully described, may be snapped over the fitting. It is sufficient here to state that the check valve 28 is part of the pulsator assembly 29 that is adapted to be positioned on or removed from the receptacle, as will be more fully explained as this description proceeds.

The open ends of the containers 2 and 3 are juxtaposed, with the sealing gasket ring 10 between them, and they are then clamped together to form a single receptacle. The clamping may be accomplished in any desired manner. In the present instance there has been shown a series of three clasps 33 spaced 120° apart and each secured to the container 2. Each of the clasps 33 consists of a plate 34 welded to the container 2, and forming a pivotal support at 35 for a hand lever 36, in which is swiveled a looped spring hook member 37 that swings about a pivot axis 38 that is part of the lever 36. The hook member 37 is adapted to hook under the curl 8 of the container 3. When the lever 36 is in the position illustrated in Figure 1 the clasps draw the two containers towards one another and firmly press the curls 8 of the two containers towards the opposite surfaces of the ring gasket 10. When the lever 36 is swung counter-clockwise from the position illustrated in Figure 1 it permits the hook portion of the clasp 37 to release from the curl 8 of the container 3 and permit separation of the two containers.

A metal handle 40 is welded or otherwise permanently secured to the outside of the container 2. The handle includes a carrying bar 41 which may be gripped by the hand to carry the entire receptacle, or which may be suspended from a surcingle to hold the receptacle in position beneath a cow during milking. To facilitate suspension of the milker from the cow, the carrying bar 41 has a number of notches 42, 43, 44 and 45 formed therein so that the carrying bar may be positioned on a surcingle rod 46 at any one of the notches 42—45 in such a manner as to permit tilting of the receptacle about the rod 46. As seen in Figure 1, the axis of tilt of the receptacle 1 would pass through the center of the surcingle rod 46 in a direction at right angles to the plane of the sheet of Figure 1. The receptacle is suspended from the surcingle with the closed end of the container 3 facing toward the teats of the cow and with the longitudinal axis of the receptacle extending lengthwise of the cow. It is to be noted that the bar 41 extends beyond the open end of the container 2 and that the last notch 45 is a considerable distance beyond the open end of the container 2. This is provided to allow a wide range of variations in the point of support of the receptacle from the surcingle to permit varying the pull on the cow's teats as the milking proceeds and the receptacle fills. The handle 40 is of a generally smooth exterior surface to facilitate cleaning thereof.

As previously stated, the container 3 has a pour-out spout 15 which is adapted to be covered by a cap or cover 20. The cover 20 consists of a stainless steel circular disc of a diameter somewhat greater than the outside diameter of the curl 18 on the spout 15. The disc has four milk line receiving tubes or nipples 50 extending therefrom, each with its longitudinal axis at an angle approximately 30° to the plane of the cover 20. Each nipple opens through the lid 20 for discharging the milk into the receptacle. In order to assure that the streams of milk that flow through the nipples into the receptacle shall not enter the receptacle at an acute angle to the horizontal a baffle is provided on the under side of the cover 20. This baffle takes the form of a flat oversized round gasket 55 of flexible rubber or other suitable gasketing material. When the oversize gasket is positioned in the cover the gasket flexes outwardly to a dished formation spacing the gasket from the cover inwardly of the rim of the cover. The gasket provides a circular rim 56 between the bottom of the cover 20 and the top of the curl 18 that forms a vacuum tight seal between the cover and the pour-out spout 15. The gasket has a central opening 57 at the bottom of the dished portion of the gasket. Streams of milk flowing downwardly through the milk line nipples 50 strike the gasket 55. Any swirling or agitation of the milk that does take place by reason of the inclination of the nipples 50 takes place in the space between the gasket 55 and the cover 20, the milk then flowing vertically downwardly through the opening 57. In order to facilitate retention of the gasket within the cover while at the same time permitting removal of the gasket from the cover to facilitate cleaning, the cover 20 has an inwardly inclined peripheral rim 58 on the under side thereof so that on lifting of the cover from the receptacle the gasket lifts with the cover. The gasket 55 is, however, easily removed from the cover. It is to be noted that the diameter of the cover is appreciably greater than the outside diameter of the pour-out spout 15 so that the cover does not have to be centered on the pour-out spout. The cover has a limited freedom of sliding movement across the spout.

The cover has an inverted U-shaped bail or spring catch 59 secured thereto. This spring catch may consist of a piece of wire bent into a generally channel shape. The ends of the wire are of somewhat reduced diameter and fit snugly through holes in the lid or cover, the ends being riveted over on the under side of the lid.

A description will now be given of the construction of the pulsator 29 insofar as the pulsator is modified from prior constructions, in order to facilitate its use on the container 3. The pulsator includes a pulsator block 65 on which is mounted a pulsating mechanism which may be of any preferred construction, for instance, one such as shown in my application for patent filed of even date herewith. A cup-shaped fitting 66 is secured to the under side of the pulsator as by a screw 67 that threads into the pulsator block 65. A suitable ring gasket 68 is located between the fitting and the block to provide a vacuum tight seal around the space where the fitting engages the block. The fitting has a vacuum chamber 70 into which a pipe 71 extends, the pipe being pressed into the fitting in a manner to make a vacuum type seal between the pipe and the fitting. The pipe 71 has a pulsator handle 72 around the same and terminates in a vacuum line receiving nipple 74 to which there may be connected a vacuum hose for extending vacuum to the pulsator and, as will be presently described, also to the milk receptacle.

A branch from the pipe 71 is formed by the plug-in type check valve 28 that was previously referred to. To that effect a hole 76 is formed on the under side of the pipe 71 and a vacuum fitting 78 (Fig. 3) is welded to the pipe 71 around the hole 76. A tubular valve body 80, of rubber or the like, is tensioned around the fitting 78. To facilitate retention of the valve body on the fitting 78 the fitting is outwardly flared downwardly from the pipe 71. The valve body 80 has a central opening 82 formed by a circular ledge 83 that constitutes a valve seat for a check valve stem 84. The check valve stem seats by gravity on the ledge 83 and closes the opening 82, but the stem is adapted to be raised by a preponderance of pressure below the stem as compared to the vacuum pressure above the stem. The rubber valve body 80 is adapted to be snapped over the fitting 25 so that the ledge 83 seats on the top of the fitting 25, and the bottom portion of the valve body 80 makes a vacuum tight seal around the top of the fitting 25. The vacuum fitting 78 and the valve body 80 and the check valve stem 84 are circular in cross section when viewed on a section taken in a plane at right angles to the longitudinal center line 86.

The pulsator block 65 has a pulsator spring 90 secured to the under side thereof. This spring has a U-shaped bend 91 at the bottom thereof which is inserted through the U-shaped bail or spring catch 59. The cover, suspended from the pulsator by the spring, is positioned on the receptacle spout and then the pulsator is brought down to a horizontal position with the portion 91 of the spring 90 resting on the cover 20, and the valve body 80 is pressed downwardly onto and over the fitting 25. This establishes a valved connection between the vacuum pipe 71 and the interior of the receptacle. If vacuum is then applied to the pipe 71 as, for instance, by connecting the same to a vacuum line, the vacuum will draw the valve stem 84 upwardly and thus exhaust the air from the receptacle. If the vacuum is at any time disconnected from the pipe 71 and atmospheric pressure substituted therefor the valve stem 84 immediately falls and maintains the previously established vacuum within the receptacle.

It is to be noted that the position of the pulsator on the receptacle is determined by the plug-in connection between the valve body 80 and the nipple 25 and that the cover 20 has a limited permissive movement across the spout. This obviates the need of extreme precision in locating the valve nipple 25 with respect to the spout 15. Only the check valve connection 28 between the pulsator and the receptacle is fixed with respect to the receptacle. The position of the other end of the pulsator with respect to the receptacle does not have to be fixed because the cover itself has freedom of movement with respect to the pour-out spout 15.

When the suspended milker of the present invention is in use each of the nipples 50 is connected to a different one of the four milk tubes from the four inflations that are positioned on the cow's teats and each of the four vacuum nipples 95 of the pulsator is connected to a different one of the four vacuum tubes of the same four inflations or shells that receive the inflations. At that time a rubber tube connects the nipple 74 at the end of the pipe 71 to a vacuum line. When the milking operation on one particular cow has been completed the dairyman disconnects from the vacuum line the hose that is connected to the nipple 74. This immediately applies atmospheric pressure to the pipe 71 and therefore the check valve 28 closes. Closing of this valve prevents a rush of air into the receptacle by way of the vacuum pipe line that is connected to the nipple 74. This vacuum pipe line sometimes has an accumulation of debris therein and it is for this reason that it is important that there be no reverse flow of air from that line into the milk receptacle. The dairyman also removes the four teat cups from the cow's teats and generally permits the inflations to hang downwardly from the four nipples 50 and the four nipples 95. The hose from the respective inflations that are connected to the nipples 50 close off those nipples in a manner customary in the art, as shown, by way of example, in the patent to McCornack, No. 1,859,213. When it is desired to empty the container it is merely necessary to pull upwardly on the handle 72. This causes the check valve 28 to disengage from the ring fitting 25 and permit lifting of the pulsator assembly. Lifting of the pulsator causes the hook spring 90 to engage the bail 59 of the cover and lift the cover off of the pour-out opening 15. Thus, lifting of the handle 72 causes the pulsator and the cover and the four connected inflations to be lifted as a unit from the receptacle. The ledge 21 of the receptacle 1 may then be positioned on a milk receptacle bail and the milk from the receptacle 1 poured through the pour-out opening 15. Since air can enter the receptacle 1 through the now open fitting 25 there is no gurgling of air at the pour-out opening as milk is poured from the receptacle.

It is to be noted that the present structure lends itself readily to cleaning. The two containers 1–2 may easily be separated from one another, thus exposing all of the interior of each of the containers for cleaning. To clean the valve 28 it is merely necessary to force the rubber valve body 80 from the fitting 78 over which it is sprung. Thereafter the valve stem 84 can be lifted from the valve body 80, thus exposing all of the parts for cleaning. From the above description it is apparent that the assembly and disassembly of the parts of the present milker is a very simple matter.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A milk container open at one end with the opening extending from adjacent to the bottom of the container to adjacent to the top thereof, means for closing the opening and maintaining it closed, said means including a closure member for the opening, and a light pervious sealing gasket between the container and the closure member, the gasket being exposed on the outside of the container and also on the inside of the container whereby the milk level in the container may be observed through the gasket.

2. A milk container open at one end with the opening extending from adjacent to the bottom of the container to adjacent to the top thereof, means for closing the opening and maintaining it closed, said means including a closure member for the opening, a light pervious sealing gasket between the container and the closure member, the gasket being exposed on the outside of the container and also on the inside of the container whereby the milk level in the container may be observed through the gasket, and a scale adjacent to and paralleling the gasket and calibrated to indicate the milk content of the container.

3. A milk receptacle comprising two cylindrical containers each having an end closure from which extends a cylindrical wall opening opposite the end closure, the openings of the two containers being of the same cross sectional shapes and juxtaposed so that the two containers form a single receptacle, light pervious sealing gasket means between the two containers, means for clamping the two containers towards one another and to compress the gasket means, the gasket means being exposed on the inside and on the outside of the receptacle whereby the milk level is observable through the gasket.

4. A milk receptacle comprising two cylindrical containers each having an end closure from which extends a cylindrical wall opening opposite the end closure, the openings of the two containers being of the same cross sectional shapes and juxtaposed, with the two containers in alignment to form a single receptacle, light pervious sealing gasket means between the two containers, means for clamping the two containers towards one another and to compress the gasket means, means for supporting the receptacle in a position with the gasket means extending from the top to the bottom of the receptacle, the gasket means being exposed on the inside and on the outside of the receptacle whereby the milk level is observable through the gasket means.

5. A milk receptacle comprising two cylindrical containers each having an end closure from which extends a cylindrical wall opening opposite the end closure, the openings of the two containers being of the same cross sectional shapes and juxtaposed, with the two containers in alignment to form a single receptacle, light pervious sealing gasket means between the two containers, means for clamping the two containers towards one another and to compress the gasket means, means for supporting the receptacle in a position with the gasket means extending from the top to the bottom of the receptacle, the gasket means being exposed on the inside and on the outside of the receptacle whereby the milk level is observable through the gasket means, and calibrated scale markings indicating the milk content of the receptacle at different scale levels observable through the gasket.

6. A milk container open at one end with the opening extending from adjacent to the bottom of the container to adjacent to the top thereof, a closure member for the opening, and a light pervious sealing gasket between the container and the closure member, means for holding the closure member over the opening, the gasket being exposed on the outside of the container and also on the inside of the container whereby the milk level in the container may be observed through the gasket, said closure member constituting a second container having an opening juxtaposed with respect to the opening in the first container so that the two containers form a single receptacle.

7. A milk container open at one end with the opening extending from adjacent to the bottom of the container to adjacent to the top thereof, a closure member for the opening, a light pervious sealing gasket between the container and the closure member, means for holding the closure member over the opening, the gasket being exposed on the outside of the container and also on the inside of the container whereby the milk level in the container may be observed through the gasket, and a scale adjacent to and paralleling the gasket and calibrated to indicate the milk content of the container, said closure member constituting a second container having an opening juxtaposed with respect to the opening in the first container so that the two containers form a single receptacle.

8. A milk receptacle for a suspended milker comprising two cylindrical containers each having an end portion from which extends a cylindrical wall terminating in an opening at the end of the container opposite the end portion, the openings in the two containers being of the same cross sectional shapes and juxtaposed with the two containers in alignment to form a single receptacle, sealing gasket means between the two containers, means for clamping the two containers towards one another and to compress the gasket means, a carrying handle secured to and extending lengthwise of one container for hanging the receptacle during milking and extending over the other container, a pour-out opening formed in said other container adjacent the end portion thereof and in alignment with the handle in a direction parallel to the longitudinal axes of the aligned containers, and a cover for the opening.

9. A milk receptacle for a suspended milker comprising two cylindrical containers each having an end portion from which extends a cylindrical wall terminating in an opening at the end of the container opposite the end portion, the openings in the two containers being of the same cross sectional shapes and juxtaposed with the two containers in alignment to form a single receptacle, sealing gasket means between the two containers, means for clamping the two containers towards one another and to compress the gasket means, a hang-up handle secured to and extending lengthwise of one container for hanging the receptacle during milking, a pour-out opening formed in the cylindrical wall of the other container adjacent the end portion thereof and in alignment with the handle in a direction parallel to the longitudinal axes of the aligned containers, a cover for the opening, the cylindrical portion of each of the containers having supporting legs for supporting the receptacle against rolling when the receptacle is placed on a horizontal support with the longitudinal axes of both containers horizontal.

10. A milk container for a suspended milker comprising a base and a cylindrical shell open at one end and extending from the base at its opposite end, and a handle secured at one end to the container and extending in a direction lengthwise of the longitudinal axis of the cylindrical shell as an open hang-up hook free of the container at its other end, said handle having a plurality of surcingle positioning means spaced from one another lengthwise of the handle for positioning the handle on a surcingle in selective positions.

11. A milk container for a suspended milker comprising a base and a cylindrical shell open at one end and extending from the base at its opposite end, and a handle secured at one end to the container and extending in a direction lengthwise of the cylindrical shell as an open hang-up hook free of the container at its other end, said other end projecting beyond the open end of the shell, said handle having a plurality of surcingle positioning means spaced from one another lengthwise of the handle for positioning the handle on a surcingle in selective positions, at least one of the positioning means on the handle being at the portion of the handle beyond the open end of the container.

12. A milk container for a suspended milker comprising a base and a cylindrical shell open at one end and extending from the base at its opposite end, and a handle secured at one end to the container and extending in a direction lengthwise of the cylindrical shell as an open hang-up hook free of the container at its other end, a second container having an open end, the two containers being positioned with the two open ends juxtaposed to form a single receptacle, and means securing the two containers together, said handle projecting from the first container past the open end thereof and overlying a portion of the second container.

13. A milk receptacle comprising two cylindrical containers each having an end portion from which extends a cylindrical wall terminating in an opening at the end of the container opposite the end portion, the openings in the two containers being of the same cross sectional shapes and juxtaposed with the two containers in alignment to form a single receptacle, sealing gasket means between the two containers, means for clamping the two containers towards one another and to compress the gasket means, said gasket means being transparent and being exposed on the inside and on the outside of the container whereby the milk level in the receptacle may be observed through the gasket means, a calibrated scale for indicating the quantity of milk content of the container as visible through the gasket means, a pour-out opening formed in one container adjacent the end portion thereof, and a cover for the opening.

14. A milk receptacle comprising two cylindrical containers each having an end portion from which extends a cylindrical wall terminating in an opening at the end of the container opposite the end portion, the openings in the two containers being of the same cross sectional shapes and juxtaposed with the two containers in alignment to form a single receptacle, sealing gasket means between the two containers, means for clamping the two containers towards one another and to compress the gasket means, said gasket means being transparent and being exposed on the inside and on the outside of the container whereby the milk level in the container may be observed through the gasket means, a calibrated scale for indicating the quantity of milk content of the receptacle as visible through the gasket means, a hang-up hanger secured to one container, a pour-out opening formed in the cylindrical wall of the other container adjacent the end portion thereof, a cover for the opening, the cylindrical portion of each of the containers having supporting legs for supporting the receptacle against rolling when the receptacle is placed on a horizontal support with the longitudinal axes of both containers horizontal.

15. A milk container for a suspended milker comprising a base and a cylindrical shell open at one end and extending from the base at its opposite end, and a handle secured at one end to the container and extending in a direction lengthwise of the cylindrical shell as an open hang-up hook free of the container at its other end, a second container having an open end, the two containers being positioned with the two open ends juxtaposed to form a single receptacle, a transparent sealing gasket between the two containers, said gasket being exposed on the outside of the container and also on the inside of the container whereby the milk level in the container may be observed, and means securing the two containers together, said handle projecting from the first container past the open end thereof and overlying a portion of the second container.

References Cited in the file of this patent

UNITED STATES PATENTS

| Number | Name | Date |
|---|---|---|
| 128,003 | Wiley | June 18, 1872 |
| 1,273,103 | Sanders | July 16, 1918 |
| 1,376,216 | Mittinger | Apr. 26, 1921 |
| 1,392,346 | McCornack | Oct. 4, 1921 |
| 1,653,756 | Babson | Dec. 27, 1927 |
| 1,989,351 | Crowell | Jan. 29, 1935 |
| 2,099,783 | Whiteside | Nov. 23, 1937 |
| 2,294,473 | Makeley | Sept. 1, 1942 |
| 2,404,069 | Hinman | July 16, 1946 |
| 2,454,872 | Harris | Nov. 30, 1948 |
| 2,463,920 | Thomas | Mar. 8, 1949 |
| 2,628,589 | Reeve | Feb. 17, 1953 |